United States Patent
Hu et al.

(10) Patent No.: US 9,130,462 B2
(45) Date of Patent: Sep. 8, 2015

(54) RESONANT POWER CONVERTER HAVING SWITCHED SERIES TRANSFORMER

(75) Inventors: Haibing Hu, Orlando, FL (US); Xiang Fang, Orlando, FL (US); Issa Batarseh, Orlando, FL (US); Zheng John Shen, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 495 days.

(21) Appl. No.: 13/365,871

(22) Filed: Feb. 3, 2012

(65) Prior Publication Data

US 2013/0201726 A1    Aug. 8, 2013

(51) Int. Cl.
 *H02M 3/335* (2006.01)
 *H02M 3/28* (2006.01)
 *H02M 1/00* (2007.01)

(52) U.S. Cl.
 CPC ............... *H02M 3/28* (2013.01); *H02M 3/335* (2013.01); *H02M 2001/0058* (2013.01); *Y02B 70/1433* (2013.01); *Y02B 70/1491* (2013.01)

(58) Field of Classification Search
 USPC ............................... 363/15, 16, 17, 21.02, 65
 See application file for complete search history.

(56) References Cited

U.S. PATENT DOCUMENTS

| | | | |
|---|---|---|---|
| 6,388,898 B1 | 5/2002 | Fan et al. | |
| 7,365,451 B2 | 4/2008 | Aritsuka | |
| 7,403,402 B2 * | 7/2008 | Odell et al. | 363/21.01 |
| 2008/0094862 A1 | 4/2008 | Li et al. | |
| 2009/0168461 A1 * | 7/2009 | Nakahori | 363/17 |
| 2010/0165668 A1 * | 7/2010 | Lin | 363/21.02 |
| 2011/0007527 A1 * | 1/2011 | Liu et al. | 363/21.02 |
| 2011/0026285 A1 * | 2/2011 | Kawashima et al. | 363/127 |

OTHER PUBLICATIONS

Haibing Hu, et al., "Optimal Design Considerations for a Modified LLC Converter with Wide Input Voltage Range Capability Suitable for PV Applications", University of Central Florida, Orlando, FL, Energy Conversion Congress and Exposition (ECCE), 2011 IEEE, Sep. 17-22, 2011, pp. 3096-3103.

Robert W. Erickson, "DC-DC Power Converters", Department of Electrical and Computer Engineering, University of Colorado, Boulder, CO, Wiley Encyclopedia of Electrical and Electronics Engineering, Jun. 15, 2007.

Xiang Fang, et al., "Operation Mode Analysis and Peak Gain Approximation of the LLC Resonant Converter", Power Electronics, IEEE, Issue 99.

(Continued)

*Primary Examiner* — Nguyen Tran
(74) *Attorney, Agent, or Firm* — Jetter & Associates, P.A.

(57) ABSTRACT

A multi-transformer LLC (resonant) power converter having at least two transformers including a first $T_1$ and a second transformer $T_2$ in series includes a switch network configured for receiving input power including a first and second switched node. Resonant circuitry is coupled between the first and second switched node including a series combination of an inductor, a capacitor, a primary winding of $T_1$ and a primary winding of a $T_2$. At least one switch is operable for providing a first mode that includes $T_2$ in the resonant circuitry and a second mode that excludes $T_2$ from the resonant circuitry. Secondary windings of $T_2$ and $T_1$ are connected electrically in parallel for driving an output capacitor (Co) through respective rectifiers which provide conversion from AC to DC.

13 Claims, 14 Drawing Sheets

(56) References Cited

OTHER PUBLICATIONS

Yu-Kang Lo et al., "Analysis and Design of a Half-Bridge LLC Series Resonant Converter Employing Two Transformers", International Journal of Circuit Theory and Applications, Wiley Online Library, 2011.

Data Sheet, RM10(3C95), RM, RM/I, RM/ILP cores and accessories, Ferroxcube, Sep. 1, 2008.
Data Sheet, RM12(3C95), RM, RM/I, RM/ILP cores and accessories, Ferroxcube, Sep. 1, 2008.
TDK, Mn-Zn, Fernite Cores for Switching Power Supplies, RM Senes, Mar. 17, 2014, pp. 1-11.

\* cited by examiner

|  | Case 1<br>(LLC+FHA) | Case 2<br>(LLC+inventive design) | Case 3<br>(LLC+inventive design) |
|---|---|---|---|
| Cr(nF) | 217 | 176 | 270 |
| Lr(μH) | 5.94 | 7.33 | 4.79 |
| Lm1(μH) | 7.37 | 11.1 | 11.44 |
| Lm2(μH) | - | - | 3.86 |
| Turn ratio n1 | 1:4.4 | 1:4 | 1:5.55 |
| Turn ratio n2 | - | - | 1:16.45 |

RESONANT POWER CONVERTER HAVING SWITCHED SERIES TRANSFORMER

FIELD

Disclosed embodiments relate to the field of electric power conversion, and more particularly to electric power conversion of unregulated power sources.

BACKGROUND

Electric power systems often are used to produce electric power for different kinds of electronic equipment having different functions and electrical requirements. For example, residential photovoltaic (PV) systems can comprise a plurality a PV arrays each comprising a plurality of PV cells in series to provide electric power for a variety of residential appliances requiring different voltages, currents and polarities. PV systems process DC power since PV cells produce variable DC output.

Electric power conversion systems are used to supply subsystems with the required electrical energy by converting electrical energy supplied or generated into the specific form needed. For PV-based systems, for example, the voltage levels produced by the PV array is generally smaller than the voltage level requirements for residential appliances and therefore must be increased by the power conversion system.

Known DC-DC converters comprise a switch network for receiving an unregulated input voltage that is coupled to a resonant circuit including a capacitor, inductor and a single transformer that drives an output capacitor across which a load is placed in field use. Such known DC-DC converters have several limitations. For example, achieving peak gain is associated with a smaller inductance index, which indicates a higher magnetizing current that results in increased conduction loss and thus lower overall efficiency. There is thus a tradeoff between DC gain and efficiency.

SUMMARY

Disclosed embodiments include multi-transformer LLC (resonant) power converters having at least two transformers in series with one switched transformer that adaptively changes the magnetizing inductance (Lm) based on the input voltage ($V_{in}$) to provide different operation configurations. Disclosed resonant power converters provide both high DC gain and high power conversion efficiency, while also maintaining a wide $V_{in}$ range.

The switched series transformer is enabled or disabled by controlling at least one switch. The switch can comprise a primary side switch or a secondary side switch. For a two transformer embodiment ($T_1$ and $T_2$), disclosed power converters can be designed to operate in two modes, each mode with a different Lm value. For a Vin below a certain threshold voltage referred to herein as Vth, $T_2$ is disabled and the operation of the power converter is the same as a conventional single T resonant power converter. Significantly, for Vin above Vth, $T_2$ is enabled and the equivalent Lm is increased from Lm1 (with $T_1$ only) to $Lm_1 + Lm_2$ ($T_1$ in series with $T_2$) so that the resonant power converter has lower DC gain and keeps the circulating current low. Disclosed multi-transformer designs allow the resonant power converter to thus extend its DC gain range for wide Vin range applications while maintaining high power efficiency.

Another disclosed embodiment comprises a design methodology for selecting components values for components of disclosed multi-transformer resonant power converters having at least two transformers in series with one switched transformer. Due to the complexity in the design analysis due to multiple transformers in series, disclosed resonant power converters lack a clear design method for selecting circuit design parameters.

A design methodology is disclosed based on a resonant power converter operation mode analysis. The developed resonant power converter operation mode model provides accurate predictions of the voltage gain and resonant current/voltage waveforms. For a specified frequency and gain range, the maximum allowable Lm can be calculated using the mode model. Since disclosed dual-transformer power converters have two gain ranges separated by Vth (see FIG. 5 described below), a Vth value can be obtained through searching to find the maximum Lm1 and Lm2, and then the rest of the circuit parameters can be determined once the value of Vth is set. Vth also affects the efficiency of the power converter, so that for an efficiency-oriented circuit design, the value of Vth can be selected to achieve high power efficiency.

DETAILED DESCRIPTION

Figure 1A:
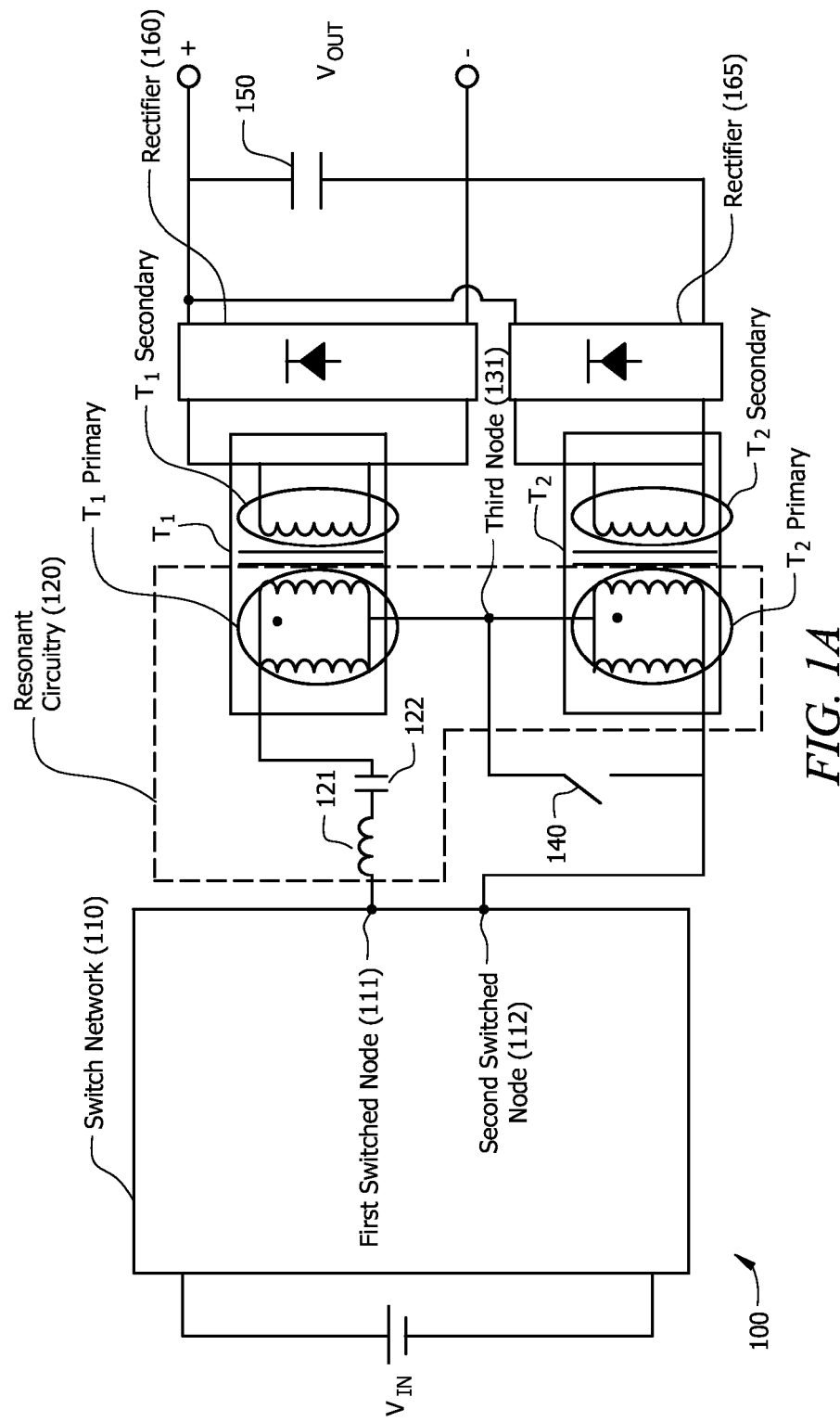
FIG. 1A is a largely block diagram representation of a multi-transformer resonant power converter having at least two transformers in series including a switched series transformer providing adaptive inductance based on input voltage, where the switched series transformer is enabled or disabled by controlling at least one switch, and where the switch comprises a primary side switch, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments. One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments include multi-transformer resonant power converters having at least two transformers in series including a switched series transformer providing adaptive inductance based on the Vin provided by a power source or power generator. Disclosed resonant power converters provide both high DC gain and high power conversion efficiency, while maintaining a wide Vin range.

FIG. 1A is a largely block diagram representation of a multi-transformer resonant converter 100 having at least two transformers in series including a switched series transformer providing adaptive inductance based on input voltage, where the switched series transformer is enabled or disabled by controlling at least one switch, and where the switch comprises a primary side switch, according to an example embodiment. Power converter 100 includes a switch network block 110 comprising a plurality of power switches (see FIGS. 2A-D for one particular switch network embodiment) configured for receiving unregulated DC input power, such as from a photovoltaic (PV) source, providing time varying DC power shown as an input voltage Vin to switch network block 110. The switch network block 110 includes a plurality of switched nodes including a first switched node 111 and a second switched node 112.

Resonant circuitry 120 is coupled between the first switched node 111 and second switched node 112 shown comprising a series combination comprising an inductor (Lr) 121, a capacitor (Cr) 122, a primary winding $T_{1primary}$ of a first transformer $T_1$ and a primary winding $T_{2primary}$ of a second transformer $T_2$. A node referred to herein as a third node 131 is between $T_{1primary}$ and $T_{2primary}$. Although power converter 100 and other power converters described herein are shown having 2 series transformers, disclosed power converters may also have 3 or more series transformers. Three or more transformers can improve the power efficiency or the Vin range of disclosed power converters. A switch 140 is connected between the third node 131 and second switched node 112 so that the switch 140 is electrically in parallel with respect to $T_{2primary}$. When the switch 140 is in a first state, $T_2$ is connected in series with $T_1$ (and conducts current and is thus "turned-on"), and when the switch 140 is in a second state $T_2$ that is electrically isolated from $T_1$ (and does not conduct current and is thus "turned-off"). The secondary winding of $T_2$ ($T_{2secondary}$) and a secondary winding of $T_1$ ($T_{1secondary}$) are connected electrically in parallel and each drive an output capacitor ($C_o$) 150 through respective rectifiers rectifier 160 and rectifier 165 to provide a DC output ($V_{out}$) that a load may be connected across.

As shown in FIG. 1A $T_2$ is thus positioned in the resonant circuitry 120 in series connection with Lr 121, Cr 122 and $T_1$. Switch 140 is electrically in parallel with $T_{2primary}$ to enable or disable $T_2$ through the state of the switch 140. As noted above, the secondary sides of the respective transformers $T_1$ and $T_2$ ($T_{1secondary}$ and $T_{2secondary}$) are connected in parallel to share driving $C_O$ 150.

In operation of power converter 100, when Vin is less than the predetermined threshold Vth, the switch 140 is on which disables (turns-off) $T_2$. In this case, the power converter 100 operates as a conventional single T resonant power converter. When Vin is greater than Vth, the switch 140 turns off turning-on $T_2$ and the total resulting magnetizing inductance on the primary side will increase from Lm1 ($T_1$ only) to Lm$_1$+Lm$_2$ ($T_1$ and $T_2$), resulting in reducing the magnetizing current. In this mode, the DC gain range for the power converter 100 is extended while keeping the magnetizing current low.

In addition, switch network block 110 and switch 140 may enable power converter 100 to be switched between a full bridge configuration and a half bridge configuration, which while in the half bridge structure will further double the DC gain (as compared to the DC gain in the full bridge configuration). For example, as described relative to FIG. 2D below where the switch comprises a bidirectional switch, by keeping S4 in the switch network conducting while turning off S5 is one way to implement a half bridge structure from a full bridge structure. Therefore, by switching between a full bridge structure and a half bridge structure combined with switching between $T_1$ only and both $T_1$ and $T_2$, disclosed power converters can provide four different operation modes (see FIGS. 3A-D described below).

Figure 1B:
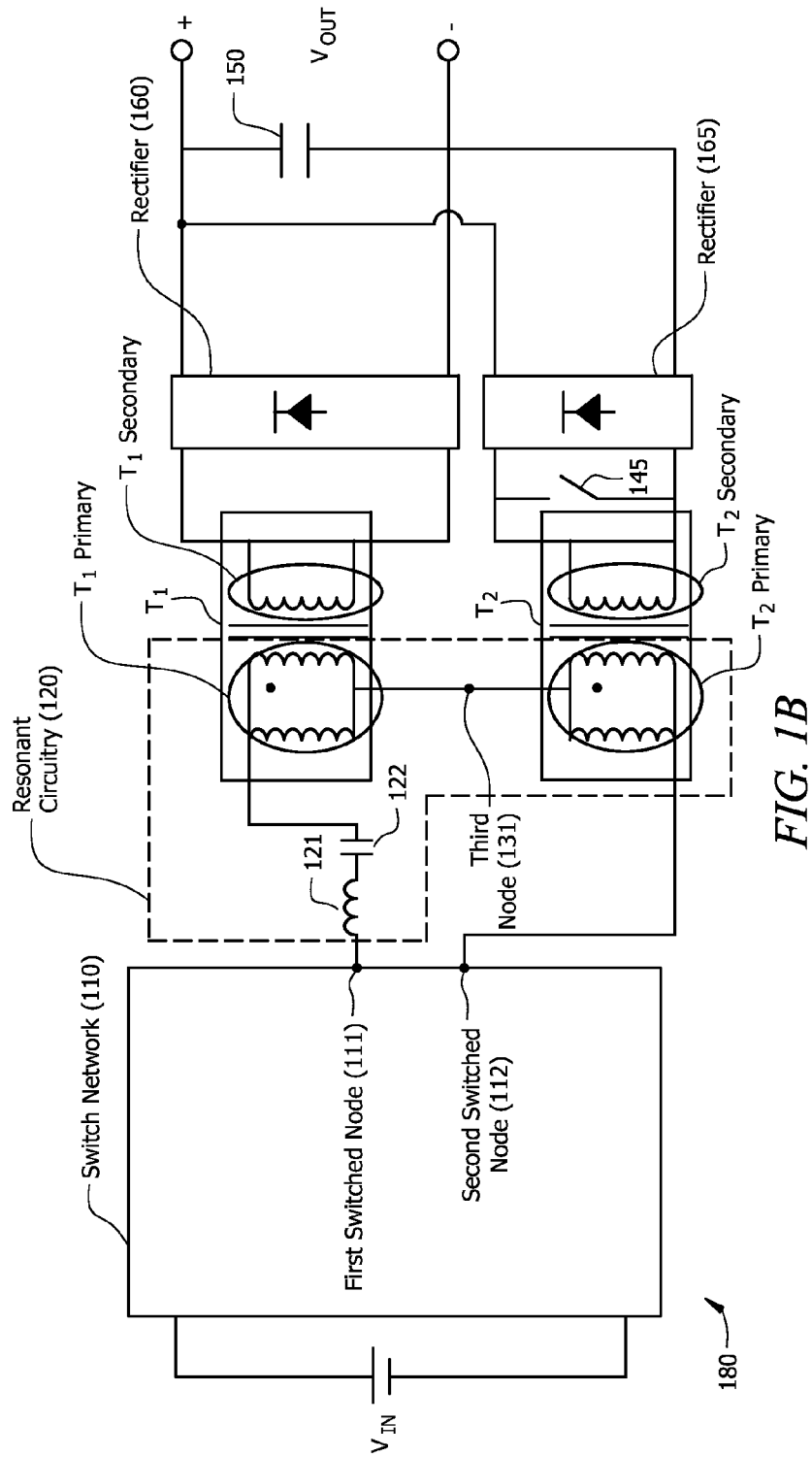
FIG. 1B is a largely block diagram representation of a multi-transformer resonant power converter having at least two transformers in series including a switched series transformer providing with adaptive inductance based on input voltage, where the switched series transformer is enabled or disabled by controlling at least one switch, and where the switch comprises a secondary side switch, according to an example embodiment.

FIG. 1B is a largely block diagram representation of a multi-transformer resonant power converter 180 having at least two transformers in series including a switched series transformer providing with adaptive inductance based on input voltage, where the switched series transformer is enabled or disabled by controlling at least one switch, and where the switch comprises a secondary side switch 145, according to an example embodiment. Other than the substitution of secondary side switch 145 for switch 140 that is a primary side switch, power converter 180 is analogous to power converter 100 shown in FIG. 1A. However, there is a power efficiency advantage to the primary side switch embodiment (FIG. 1A) over the secondary side switch embodiment of FIG. 1B because using the output switch $T_2$ is shorted through the transformer's secondary side and currents will flow through both the primary and secondary sides, which may result in additional conduction and core losses.

Figure 2A:
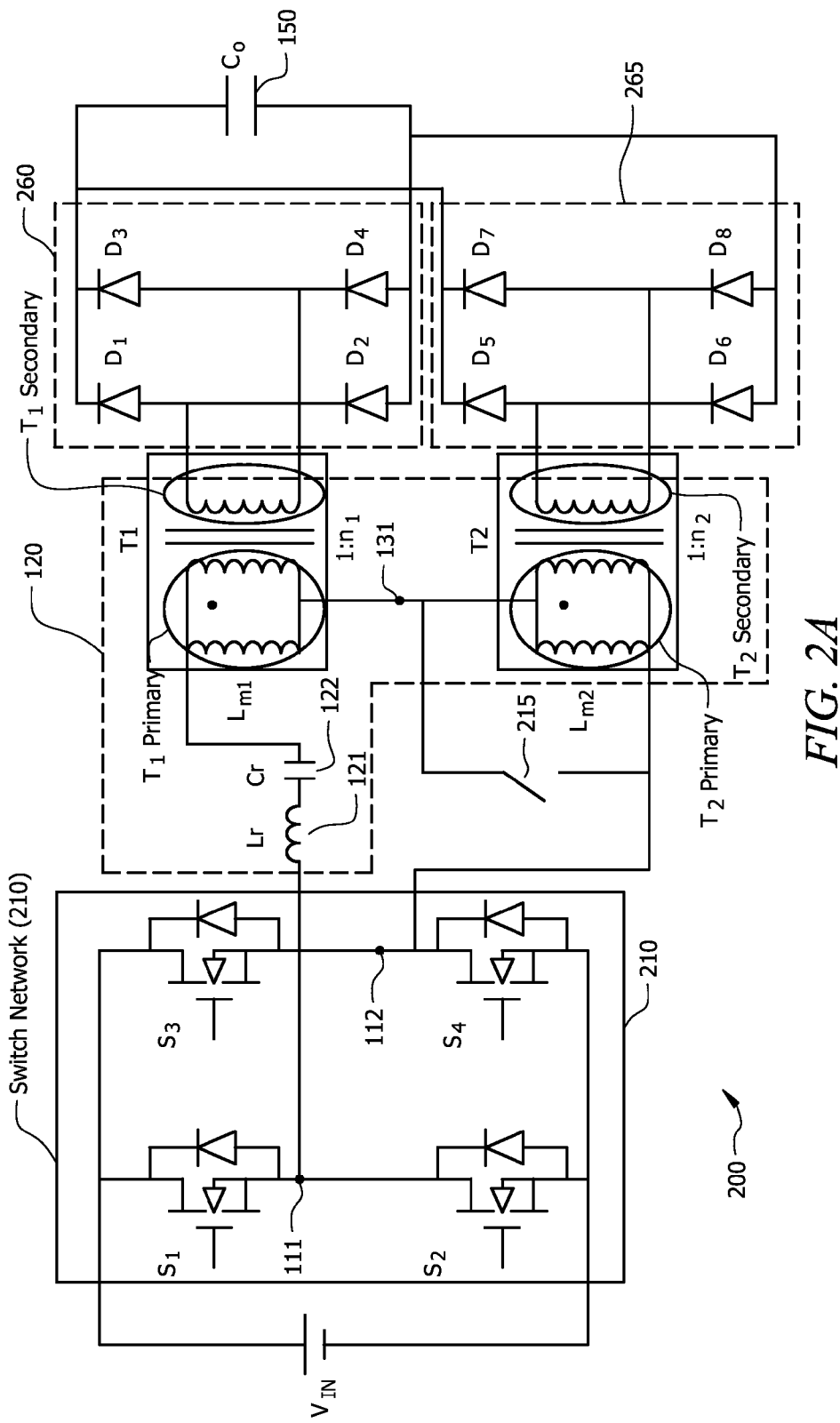
FIGS. 2A-C provide schematics for example multi-transformer resonant power converter having at least two transformers in series including a switched series transformer having example switch implementations for enabled or disabled the switched series transformer, according to an example embodiment.
Figure 2B:
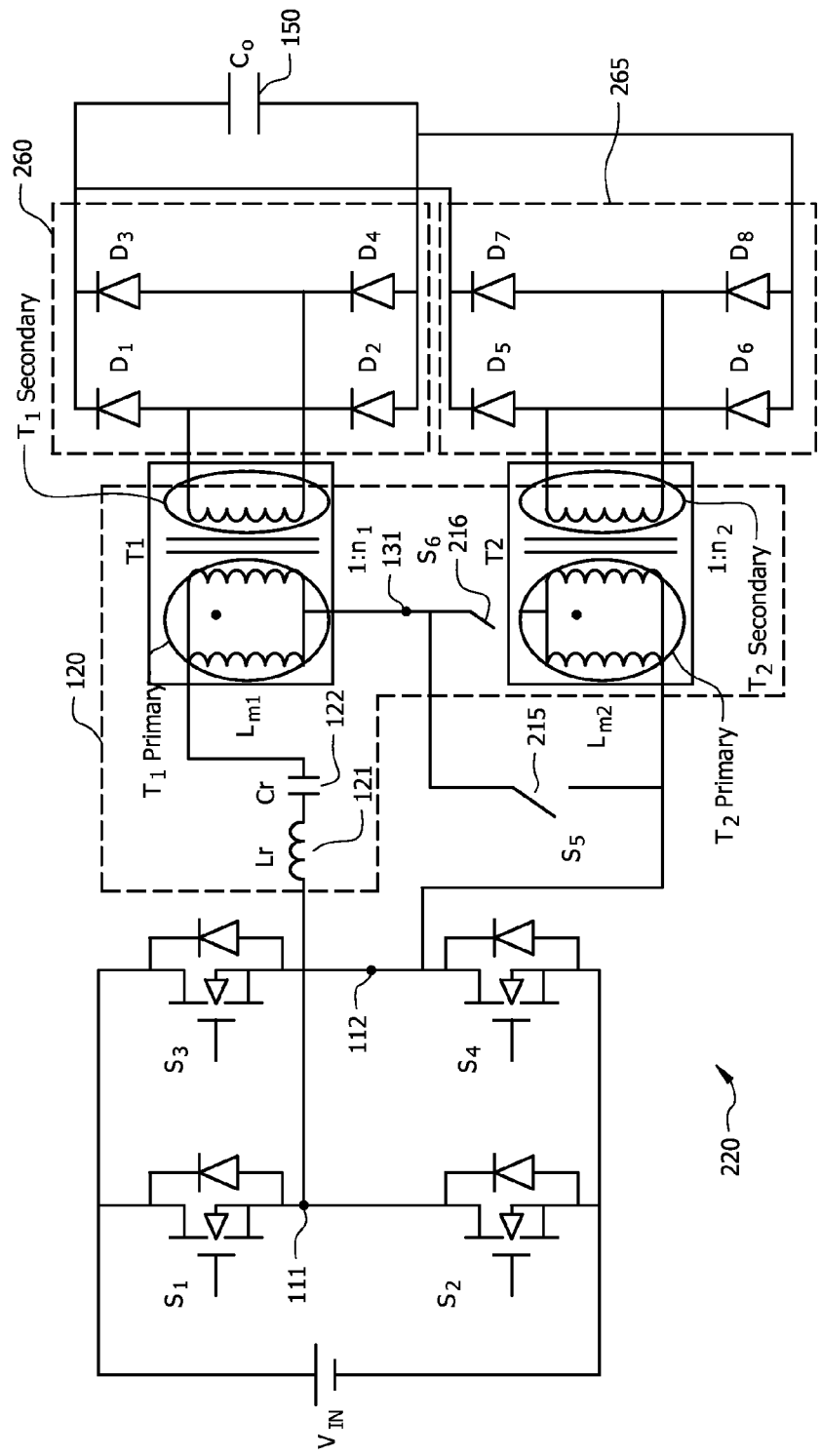
Figure 2C:
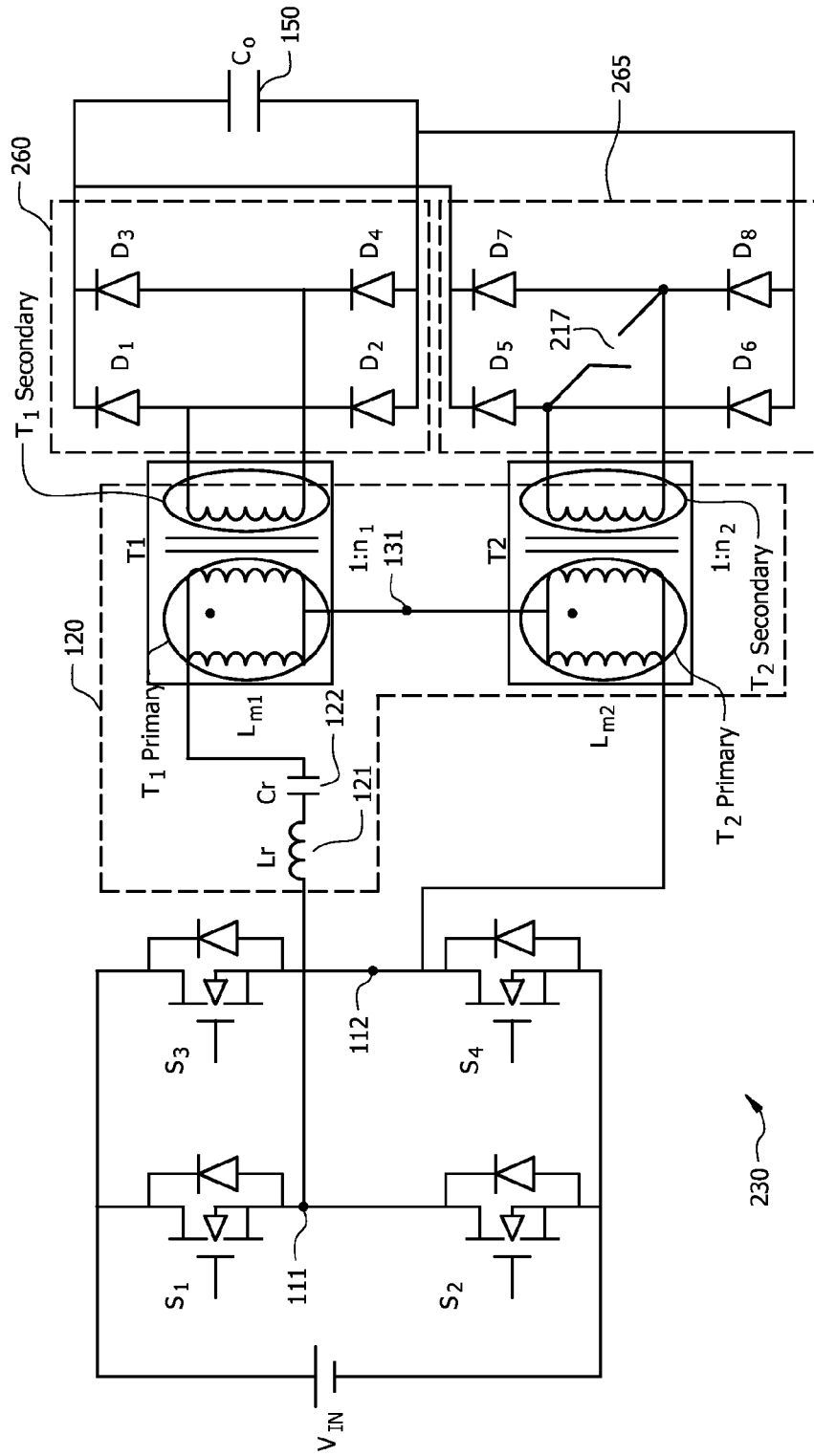

FIGS. 2A-C provide schematics for example multi-transformer resonant power converter having at least two transformers in series including a switched series transformer having example switch implementation for enabled or disabled the switched series transformer. The resonant power converter 200 shown in FIG. 2A includes a switch network 210 comprising a plurality of power switches shown comprising power NMOS switches $S_1$-$S_4$ configured for receiving unregulated input power shown as Vin which is coupled to switch network 210 of power converter 200. Although power converter 200 shows all power switches S1-S4 being NMOS power devices, the MOS power switches disclosed herein can all generally be either NMOS or PMOS devices, or a combination of NMOS and PMOS, provided an appropriate driving (firing) circuit provides the appropriate gate bias.

The switch network 210 provides a plurality of switched nodes including a first switched node 111 and a second switched node 112. Although the gates of the power NMOS devices $S_1$-$S_4$ are shown floating in FIG. 2A and the MOS devices in other FIGs herein, as known in the art, a multi-channel external gate driver circuit provides the control voltages needed to drive the gates of each MOS device to provide the switching described herein.

Power converter 200 includes the same resonant circuitry 120 shown in FIGS. 1A and 1B that is coupled between the first switched node 111 and second switched node 112 comprising a series combination comprising inductor (Lr) 121, capacitor (Cr) 122, $T_{1primary}$, and $T_{2primary}$. The third node 131 is between $T_{1primary}$ and $T_{2primary}$.

A switch 215 on the primary side is connected between the third node 131 and second switched node 112 so that the switch 215 is electrically in parallel with respect to $T_{2primary}$. The switch 215 can generally be of any form bidirectional switch such as a relay, a contact or a switch network comprising two switches in series connection. In operation of power converter 200, when the switch 215 is on, $T_2$ is disabled (turn-off). In this case, the power converter 200 operates as a conventional single T LLC power converter. When the switch 215 is off, $T_2$ is enabled (turned on), and the total resulting magnetizing inductance on the primary side will increase from Lm1 ($T_1$ only) to Lm$_1$+Lm$_2$ ($T_1$ and $T_2$), resulting in reducing the magnetizing current. In one embodiment the state of switch 215 is determined by whether Vin is less than the predetermined threshold Vth, or greater than or equal to Vth. When Vin<Vth the switch 215 can be on which disables (turns-off) $T_2$, while when Vin≥Vth, the switch 215 can be on which enables (turns-on) $T_2$.

Power converter 200 is shown including a first rectifier 260 and a second rectifier 265 which each convert alternating current received from their respective Ts to direct current. $T_{1secondary}$ is connected across $C_o$ 150 by the first rectifier 260, and $T_{2secondary}$ is connected across $C_o$ 150 by the second rectifier 265. Besides the diodes shown (D1-D8), the rectifiers 260 and 265 can also be implemented as diode connected transistors or vacuum tubes.

The power converter 220 shown in FIG. 2B is analogous to the power converter 200 shown in FIG. 2A, except another switch 216 on the primary side is added to switch 215 so that two switches are used to turn on and off $T_2$. The power converter 230 shown in FIG. 2C is analogous to the power converter 200 shown in FIG. 2A, except power converter 230 replaces switch 215 with switch 217 and thus implements switching of $T_2$ by including a switch 217 on the secondary side of the power converter 230.

Figure 2D:
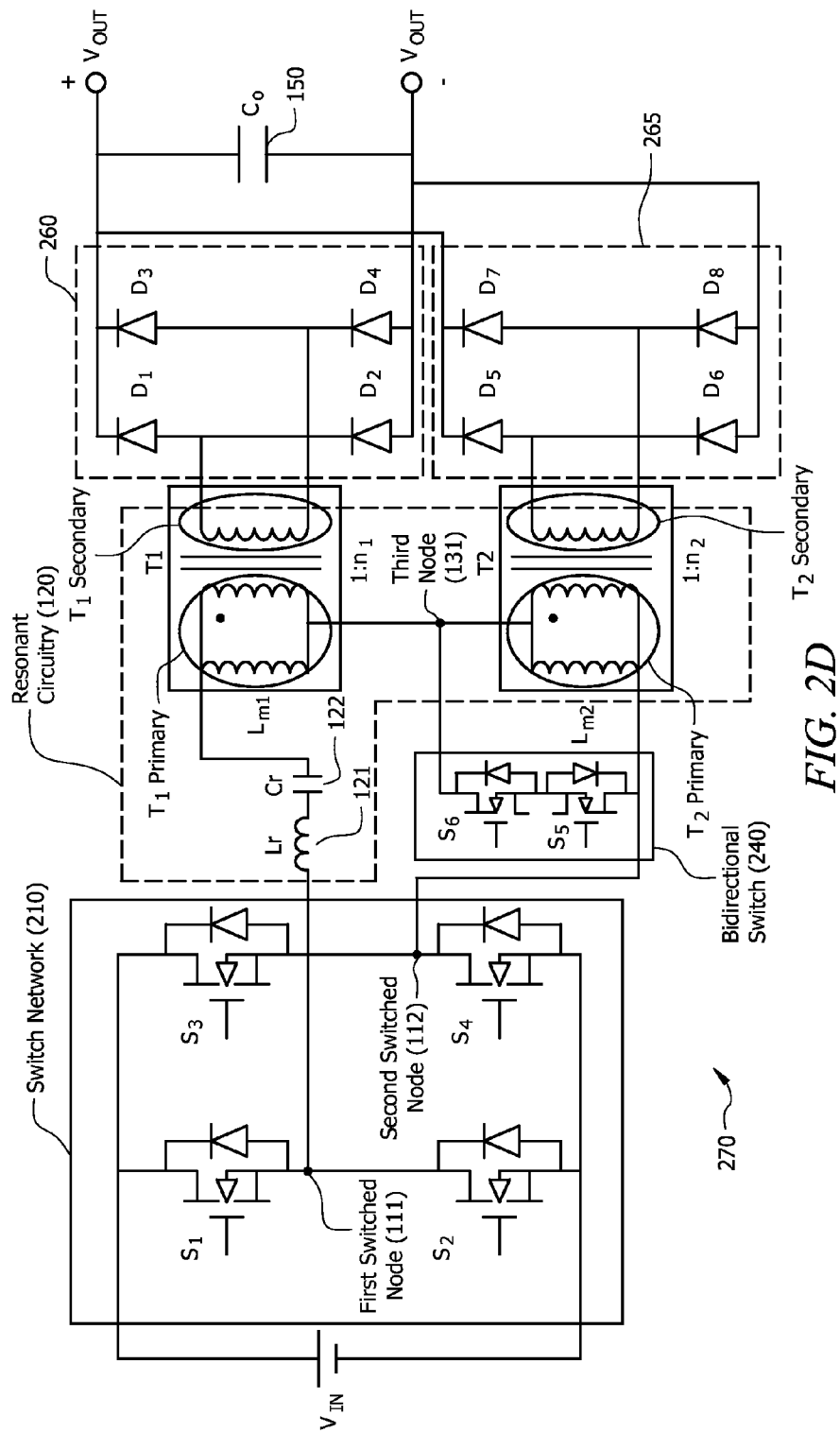
FIG. 2D is a schematic diagram of a multi-transformer resonant converter having at least two transformers in series including a switched series transformer providing adaptive inductance based on input voltage, according to an example embodiment.

FIG. 2D is a schematic diagram of a multi-transformer resonant converter 270 having at least two transformers in series including a switched series transformer providing adaptive inductance based on input voltage, according to an example embodiment. The transformer switch is shown in FIG. 2D as a bidirectional switch 240 comprising NMOS power switches S5 and S6.

Figure 3A:
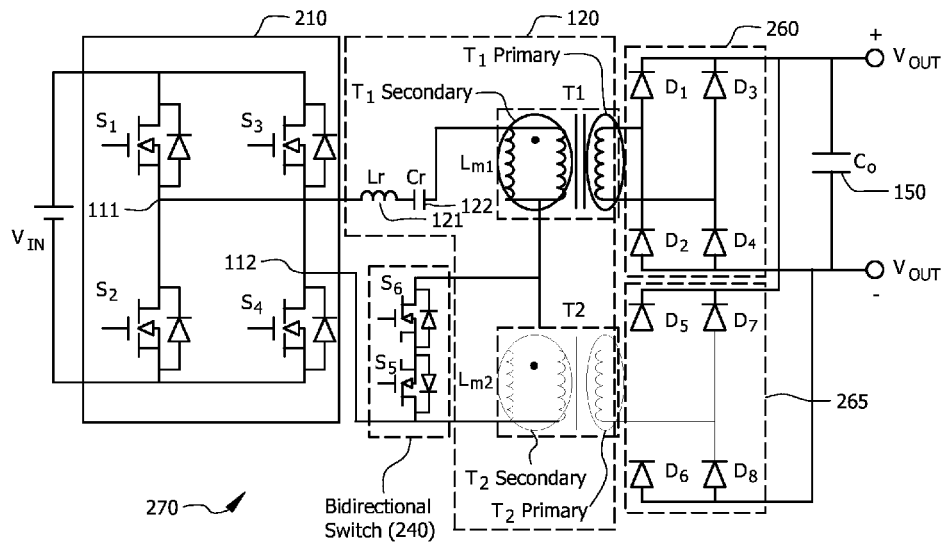
FIGS. 3A-D show different operation configurations/modes for the multi-transformer resonant converter shown in FIG. 2D.

FIGS. 3A-D show depictions of the respective four (4) different operation configurations/modes for the multi-transformer LLC resonant power converter 270 shown in FIG. 2D. It is noted that the power converters 200, 220 and 230 shown in FIGS. 2A, 2B and 2C, provide the same 4-mode operation. Mode 1 is depicted in FIG. 3A. During mode 1 $T_2$ is disabled by appropriate gate voltages applied to the gates of S5 and S6 to turn on both S5 and S6 and thus the bidirectional switch 240 on so that it acts as a shunt relative to $T_2$, thus blocking rectifier 265. During mode 1 the power converter 270 can be seen to operate as a conventional full bridge single T LLC power converter.

Figure 3B:
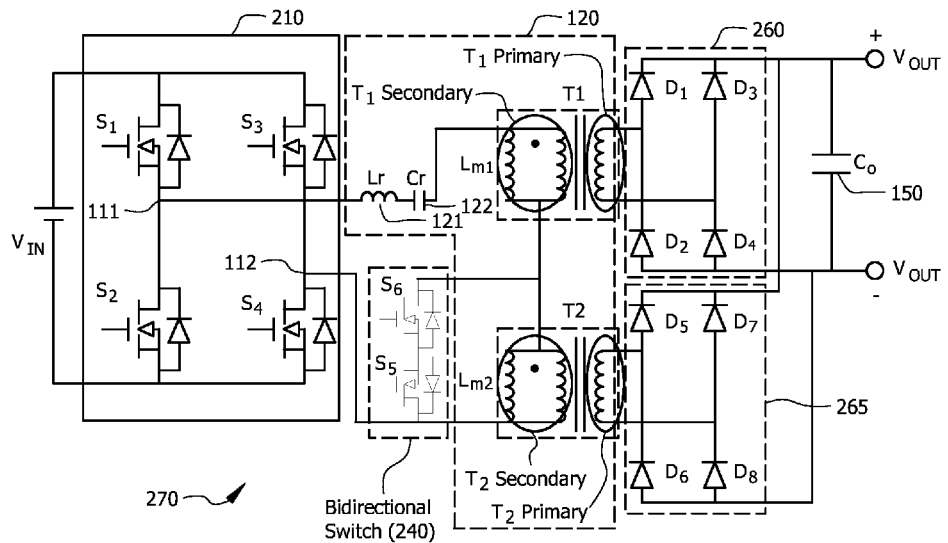

Mode 2 is depicted in FIG. 3B. During mode 2 the bidirectional switch 240 is off (at least one of S5 and S6 is off) and $T_1$ and $T_2$ operate electrically in series at their primary sides and are electrically in parallel at their secondary sides. In this mode, the total magnetic inductance is the sum of $T_1$ and $T_2$'s magnetic inductance (Lm1+Lm2). While in mode 2 power converter 270 can be seen to operate as a full bridge LLC power converter having series Ts.

Figure 3C:
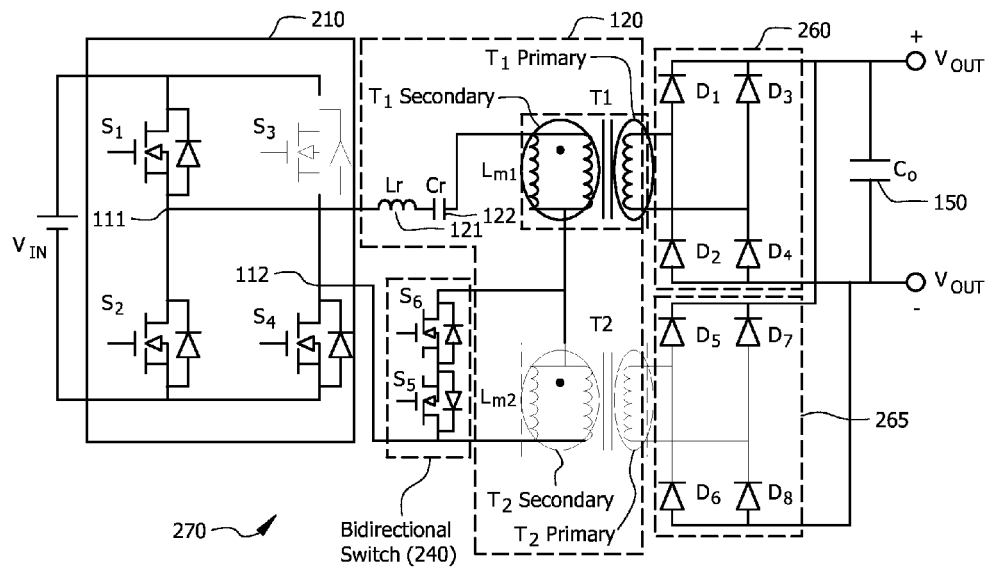
Figure 3D:
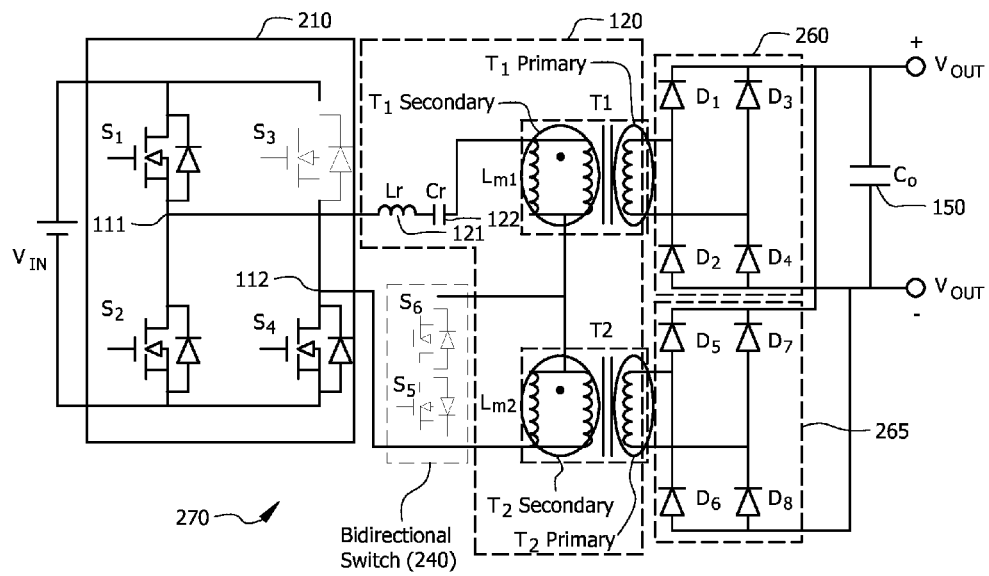

Mode 3 is depicted in FIG. 3C. In mode 3 the full bridge realized during operation in mode 1 and mode 2 is switched to half bridge operation by appropriate gate voltages applied to the gates of S3 and S4 associated with switch network 210 to switch off S3 and keep S4 on. In this mode, $T_2$ is disabled by bidirectional switch 240 which acts as a shunt as it does in mode 1. In mode 3 the DC gain of the power converter 270 is halved compared to mode 1 shown in FIG. 3A.

Mode 4 is depicted in FIG. 2D. In this mode, the full bridge realized during mode 1 and mode 2 is switched to half bridge operation as in mode 3 by appropriate gate voltages applied to the gates of S3 and S4 associated with switch network 210 to switch off S3 and keep S4 on, and $T_2$ is enabled by turning off the bidirectional switch 240. Similar to mode 3, the DC gain of the power converter 270 is half of that provided in mode 2.

Obtaining (e.g., simulating) an accurate DC gain helps guide the selection of the magnetizing inductance (e.g., $T_1$, $T_2$), which is a key parameter for achieving low magnetizing current while maintaining high DC gain. However, since the characteristics of disclosed LLC power converters are complicated by the nonlinear relationship between output voltage with excitations (input voltage and switching frequency) and load, the mathematical expression of DC gain generally becomes highly complex. To simplify the analysis of the operating characteristics of disclosed LLC power converters, a fundamental harmonic approximation (FHA) technique has been developed, where the voltages and currents are assumed to be sinusoidal waveforms, thereby permitting traditional ac circuit analysis to be employed and thus the approximated DC gain in mathematical expression to be fairly easily derived.

However, the inaccuracy in DC gain of FHA technique can mislead the design, since the difference of DC gain curves between FHA and the one obtained in simulation generally increases as the switching frequency deviates from the resonant frequency. The maximal DC gain in FHA can be significantly lower than that in simulation while the frequency corresponding to the maximal DC gain can be lower than that in simulation as well, which indicates that the design based on the FHA can lead to choosing a lower inductance to meet the desired DC gain range and thus results in higher magnetizing current and higher conduction losses. Therefore, in an efficiency oriented circuit design, an accurate DC gain is needed in choosing the right magnetizing inductance to reduce the magnetizing current while still meeting the desired DC gain range.

Although there are several other known techniques to improve the DC gain accuracy for power converters, such techniques still cannot provide an accurate DC gain due to certain approximations assumed in these techniques. It is generally straightforward to obtain the accurate DC gain characteristics by using simulation tools, such as PSPICE, SABER and PSIM. However, applying this method to a recursive optimization algorithm to find optimized parameters can be time-consuming and difficult. Another method is to use steady state equations which accurately describe resonant circuit behaviors. Thanks to advances in numerical calculation tools, such as MATLAB, this approach has become practical.

Figure 4:
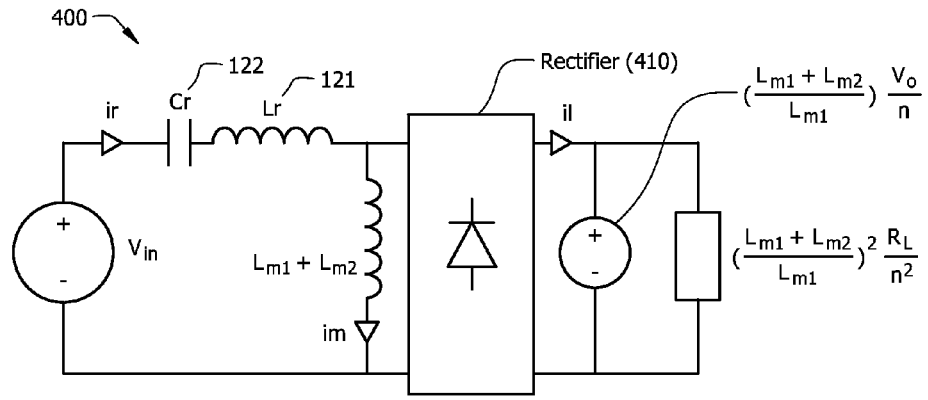
FIG. 4 is an illustration of a simulated gain curve exhibited by the multi-transformer resonant converter shown in FIG. 2D.

As shown in FIG. 4, where a second transformer is added in series to the resonant circuit of a disclosed power converter, by representing the two transformers together the equivalent circuit 400 shown in FIG. 4 can be redrawn with the transformers $T_1$ and $T_2$ represented as a single magnetizing inductance $Lm_1+Lm_2$. The rectifier is shown as 410. For a LLC power converter, it is known the circuit in the secondary side can be reflected to the one in the primary side and the equivalent circuit can be described as shown in FIG. 4. Assuming the transformer (T) turn ratio is n, the equivalent output voltage and equivalent resistance in primary side are $$\frac{V_o}{n} \text{ and } \frac{R_L}{n^2}$$

respectively. As noted above, disclosed LLC power converters may switch between operation as full bridge (modes 1 and 2) and half bridge (modes 3 and 4), and the analysis presented here covers either case by setting:

$$\begin{cases} V_{in} = V_g & \text{Full bridge} \\ V_{in} = V_g/2 & \text{Half bridge} \end{cases} \quad (1)$$

Where the $V_g$ is the amplitude of the input square wave. As for the resonant components $C_r$ 122 and $L_r$ 121, their behaviors may be described using following differential equations:

$$\begin{cases} i_r = C_r \frac{du_c}{dt} \\ u_{Lr} = L_r \frac{di_r}{dt} \\ V_{in} = u_{Lr} + u_c + u_{Lm} \end{cases} \quad (2)$$

Describing the magnetizing inductance circuit behavior is a little bit complicated as it may operate in two different scenarios: (1) When the load current, $i_l$, is greater than zero, the voltage across the magnetizing inductance, $L_m$, is clamped to $$\pm \frac{V_o}{n},$$

in which case the resonant components are $L_r$ and $C_r$ and the circuit behavior on the magnetizing inductance can be expressed as:

$$L_m \frac{di_m}{dt} = \pm \frac{V_o}{n} \quad (3)$$

(2) As the load current, $i_l$, decreases to zero, the circuit before the rectifier will disconnect the one after the rectifier, in which case the resonant components will be $L_r$, $L_m$ and $C_r$, and voltage across Lm is given as:

$$u_{Lm} = L_m \frac{di_r}{dt} \quad (4)$$

In summary, at any moment, a disclosed resonant power converter will be at any given time one of six operation modes as summarized in the table below:

| Six operation modes | | | |
| --- | --- | --- | --- |
| Mode | $V_{in}$ | $i_l$ | $u_{Lm}$ |
| 1 | + | >0 | $\frac{V_o}{n}$ |
| 2 | + | >0 | $-\frac{V_o}{n}$ |
| 3 | + | =0 | $L_m \frac{di_r}{dt}$ |
| 4 | − | >0 | $\frac{V_o}{n}$ |
| 5 | − | >0 | $-\frac{V_o}{n}$ |
| 6 | − | =0 | $L_m \frac{di_r}{dt}$ |

The circuit behaviors in each operation mode can be described using above equations. However, to solve these equations, the initial conditions or constraints should be applied. Owing to the symmetric operation, the end values of $i_r$, $iL_m$ and $u_c$ should be opposite to their initial values in steady state, whose constrains can be explicitly given as:

$$\begin{cases} i_{r(0)} = -i_{r(0+Ts/2)} \\ i_{Lm(0)} = -i_{Lm(0+Ts/2)} \\ u_{c(0)} = -u_{c(0+Ts/2)} \end{cases} \quad (5)$$

where Ts is the switching period.

For an ideal lossless power converter, the input and output power should be balanced, which allows deriving another constraint expressed as:

$$\frac{T_S}{2}\int_0^{T_S/2} V_{in}[i_r(t) - i_m(t)]dt = \frac{V_o^2}{R_L} \quad (6)$$

Based on the above provided equations and constrains, numerical tools may be used to solve these equations to achieve the current and voltage functions and DC gain curves for different operating frequency and load conditions.

As noted above, disclosed power converters provide four operation modes, each of which has its own DC gain curve. As the power converter configuration is switched from full bridge to half bridge, either mode 1 to mode 3 or mode 2 to mode 4, the DC gain will automatically be halved. Once the DC gain curves are obtained in mode 1 and mode 2, halving those DC gain curves in mode 1 and 2 thus allows drawing all four DC gain curves.

Figure 5:
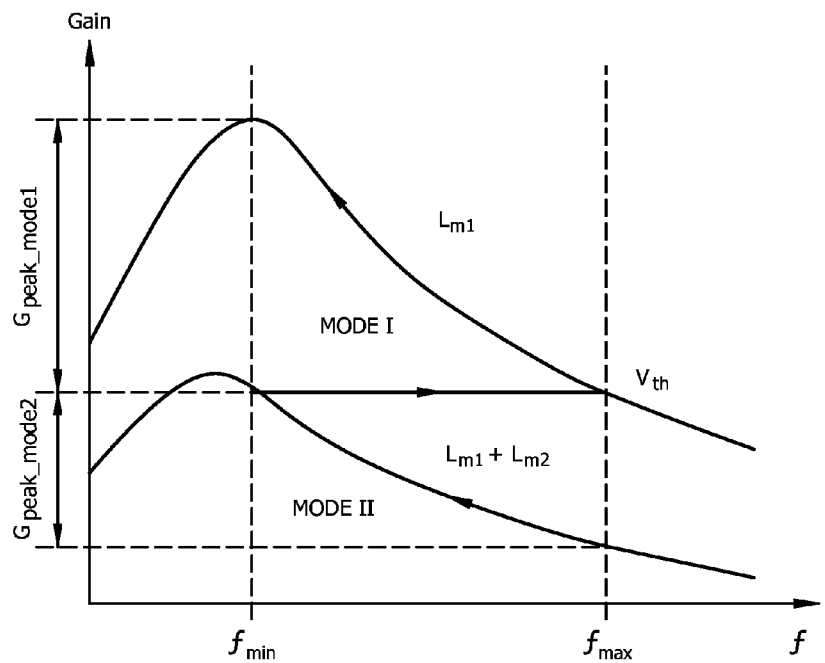
FIG. 5 is an illustration of the gain curve exhibited by the power converter shown in FIG. 2D, according to an example embodiment.

FIG. 5 is an illustration of the gain curve exhibited by the resonant power converter 260 shown in FIG. 2D, according to an example embodiment. The power converter can be seen to have two gain ranges separated by Vth. The magnetizing inductance increases from $L_{m1}$ to $L_{m1}+L_{m2}$ and the equivalent voltage and resistance in secondary side change as well. The DC gain curve can as well be achieved by using the numerical technique by rewriting the differential equations (3)-(4) with these new magnetizing inductance parameter $L_{m1}+L_{m2}$.

Due to the complexity in the analysis, disclosed resonant power converters lack a clear design method to help select the circuit parameters for best performance. Disclosed embodiments also include a design methodology for disclosed resonant power converters based on resonant power converter operation mode analysis. The developed resonant operation mode model can provide accurate predictions of the DC voltage gain and resonant current/voltage waveforms. For a specified frequency and gain range, the maximum allowable Lm can be calculated using the mode model. Since the dual-transformer converter has two gain ranges separated by Vth as shown in FIG. 5, a near optimum Vth can be obtained through searching to find the maximum $Lm_1$ and $Lm_2$ and then the rest circuit parameters can be determined. A new design procedure to generate parameters for disclosed multi-transformer LLC power converters is now described below.

As the resonant power converter operates in zero voltage switching, switching losses are greatly minimized and thus conduction and core losses become dominant. To operate disclosed resonant power converters for a wide input voltage range, the ratio of the magnetizing inductance to the resonant inductance needs to be designed to be fairly small, which means the magnetizing current accounts for a huge portion (e.g., around one third of resonant current will be magnetizing current) of resonant current at primary side. The magnetizing current portion of the resonant current depends on the load conditions. At a full load condition, magnetizing current portion can account for more than one third of resonant current, even with an optimal design, while at light load, the percentage is generally much higher and the magnetizing current will be dominant in the resonant current. The following are example for the following specifications:

Power rating: 250 W;

Input voltage range: 25-50V;

output voltage: 210V

LLC topology: conventional LLC topology (one transformer)

| Load condition | ratio Magnetizing current/resonant current | |
|---|---|---|
| | Input voltage At 25 V | Input voltage At 50 V |
| Full load | 49% | 48% |
| Half load | 78% | 67% |
| 20% load | 91% | 83% |

When the voltage across the primary side is clamped to Vo/n, the magnetizing current can be expressed as:

$$\Delta I_{Ln} = \frac{V_o}{nL_m}T_s \quad (7)$$

Where Ts is the time duration of voltage clamped to Vo/n. Normally the output voltage is fixed and the switching frequency range is determined as well. From expression 7 above, the only way to minimize the magnetizing current, $I_{Lm}$, is to obtain the $nL_m$ as large as possible. But maximizing $nL_m$ has an upper limit, since the magnetizing inductance, $L_m$ is designed to meet the maximized DC gain to ensure the expected input voltage range. In summary, a criterion is needed to find the maximal $nL_m$, while meeting the requirement of DC gain range.

For the conventional LLC power converter, the design procedure is relatively simple. The turn ratio for T, n, is easily determined by output voltage, $u_o$, and input voltage at resonant frequency. As n is determined, the next step is to search the maximal inductance, $L_m$, using numerical approach described above. However, for disclosed LLC power converters, the design process becomes a little bit more complicated by at least one additional transformer in series is inserted and for a dual transformer embodiment four operation modes exist.

For a disclosed dual-transformer power converter, the expected gain curve in Mode I and II is shown in FIG. 5. To smoothly and consecutively operate all of these four modes, the total DC gain in these two modes should be at least equal to 2, which can be expressed as:

$$G_{peak\_mode1} + G_{peak\_mode2} = 2 \quad (8)$$

As well known in the art, the larger the magnetizing inductance Lm, the lower peak DC gain would be. Since the magnetizing inductance $L_{m1}+L_{m2}$ in mode II is larger than magnetizing inductance $L_{m1}$ in mode I, the peak DC gain in mode II will be lower than the DEC gain in mode I. The peak DC gains in Mode I and II can be expressed as:

$$G_{peak\_mode1} = \frac{V_{th}}{V_{min}} \quad (9)$$

$$G_{peak\_mode2} = \frac{V_{max}}{V_{th}}$$

Thus the threshold, $V_{th}$, has the following constraint:

$$V_{th} > \sqrt{V_{min}V_{max}} \quad (10)$$

The voltage threshold $V_{th}$, is generally an important parameter for disclosed power converters as it will determine the turn (n) ratios for the T's and the DC gains for each mode. However, although $V_{th}$ has a constraint imposed by (9), it is still undetermined. If the threshold, $V_{th}$, is given, the gains for both modes can be easily determined. In this manner, it becomes possible to find the maximal $nL_{m1}$.

To avoid reverse recovery losses of the secondary diodes, the switching frequency is limited below the resonant frequency, $f_r$. At the resonant frequency, the normalized DC gain is 1. Therefore, the turn ratio, n, in Mode I can be expressed as:

$$n = \frac{V_{th}}{V_o} \quad (11)$$

As the threshold, $V_{th}$ is given and thus turn ratio (n) can be determined, the design parameters still undetermined are $L_{m1}$ and $C_r$ or $L_r$. By specifying the range of resonant capacitance, $C_r$, a searching technique can be used to find a local maximum $L_{m1}$. By setting new threshold, $V_{th}$, a new local maximum $L_{m1}$ can be found by applying same searching procedure. Repeating the above procedure, one can obtain all these local maximum $L_{m1}$ and then from them a global maximum $nL_{m1}$ can be found. In this manner, all parameters except the secondary transformer's magnetizing inductance $L_{m2}$ are determined. The next step is to find the maximum $L_{m2}$ to meet the DC gain requirement in Mode II. By setting the range of $L_{m2}$, it is relatively easy to find the maximum $n_2 L_{m2}$ using searching method. ($n_2$ is turn ratio of $T_2$).

Where $n_2$ is related to $L_{m1}$, $L_{m2}$ and $n_1$ and can be calculated as:

$$n_2 = \frac{L_{m1}}{n_1 L_{m2}} \quad (12)$$

Figure 6:
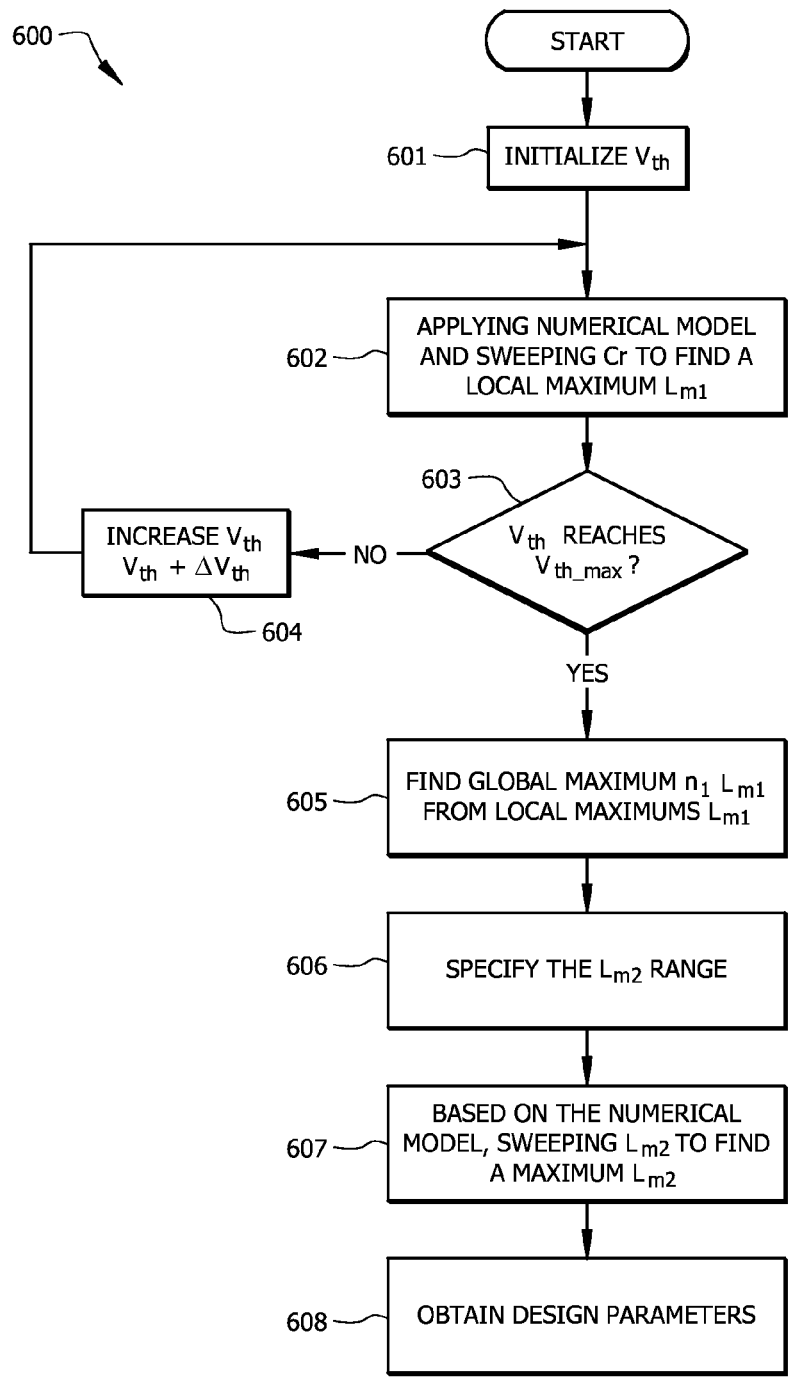
FIG. 6 is a flow chart for an example circuit design procedure for disclosed resonant power converters having two series transformers including a switched series transformer, according to an example embodiment.

FIG. 6 is a flow chart for an example circuit design method 600 for designing a disclosed LLC power converters having two series Ts, according to an example embodiment. Method 600 begins with step 601 comprising initializing (setting) the threshold voltage Vth, and from the initial Vth determining the turn ratio, n, for Mode I ($T_1$ and $T_2$) and peak gains for each mode, $G_{peak\_mode1}$ and $G_{peak\_mode2}$ (mode 2, with only $T_1$) according to expressions (8) and (10). By sweeping the resonant capacitance (Cr), the numerical model is applied to find the local maximum $L_{m1}$ in step 602. If the threshold voltage Vth is less than Vthmax in step 603, Vth is increased in step 604 and the method returns to step 602, otherwise the method proceeds to step 605. Vthmax is determined by the maximal input voltage. In step 605, from local maximums, a global maximum nLm1 is found. In step 606, a search range for $L_{m2}=[L_{m2\_min}, L_{m2\_max}]$ is specified. In step 607, the maximum $n_2 L_{m2}$ is searched based on the numerical model under the constraint of expression (8) to find a maximum Lm2. As described above, the remaining other circuit design parameters can then be obtained in step 608 to complete the circuit design.

A design example is provided to illustrate the a disclosed design procedure. Table II (copied below) shows the specifications for an example LLC power converter.

TABLE II

| Parameters | Values |
| --- | --- |
| Input voltage range(V) | 25-100 |
| Output voltage(V) | 210 |
| Rated power(W) | 250 |
| Frequency range(kHz) | 100-140 |
| Resonant frequency (kHz) | 140 |

Figure 7:
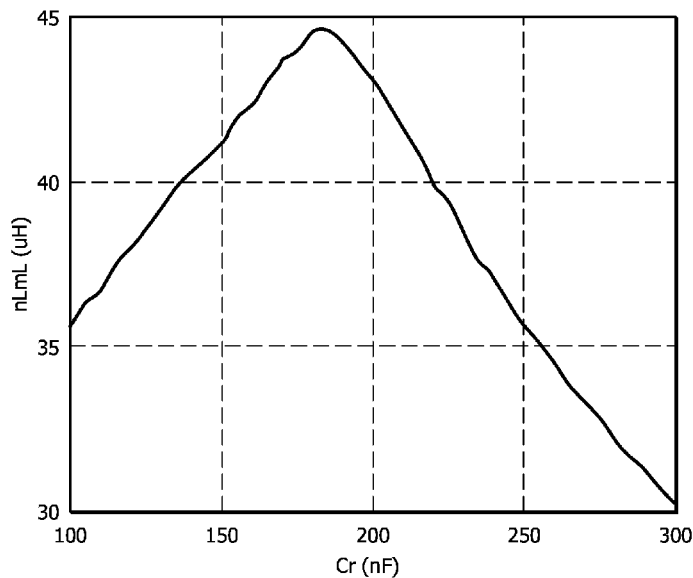
FIG. 7 shows results from a local maximum nLm1 searching result, where Vth is fixed, according to an example embodiment.

According to constraint (9) provided above, the threshold voltage range is set to [35.5 to 50V]. The resonant capacitance, $C_r$, and magnetizing inductance $L_{m1}$ are set to [150 to 300 nF] and [$L_r$ to $5L_r$] respectively. Under the guidance of this design procedure, applying the developed numerical model begins to search for design parameters. A local maximum nLm1 searching result is shown in FIG. 7, where Vth is fixed. As the resonant capacitance, Cr, changes, the largest inductance $L_{m1}$ to meet the desired gain $G_{peak\_mode1}$ changes as well and has a local maximum $L_{m1}$. For each given threshold voltage, the local maximum $nL_{m1}$ curve has similar shape.

Figure 8:
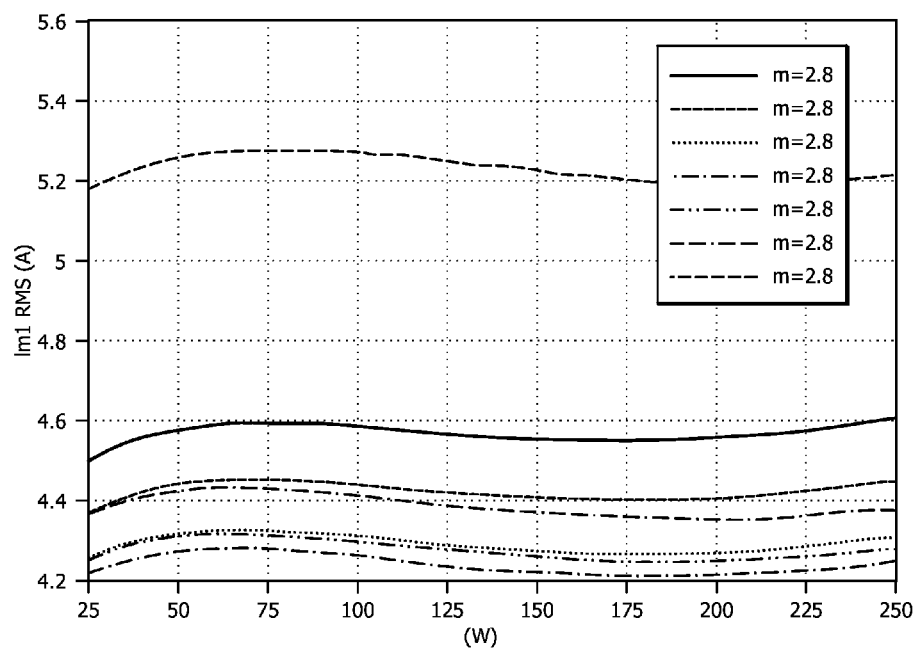
FIG. 8 shows the magnetizing RMS currents changing as load and magnetizing inductance vary, which indicates that lowest RMS current is achievable by choosing an appropriate magnetizing inductance, according to an example embodiment.
Figures 9, 10:
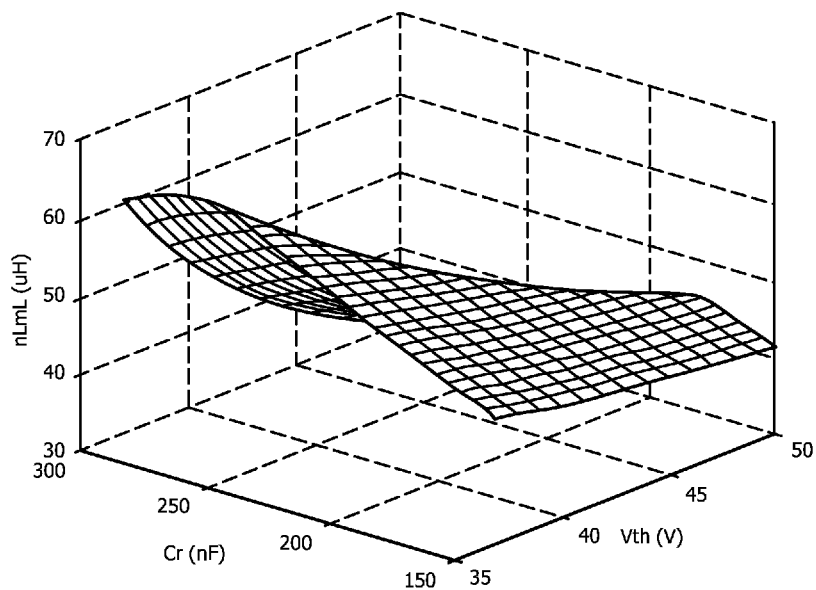
FIG. 9 shows the local maximum $nL_{m1}$ increases as Vth decreases from 50V, but when the threshold voltage reaches to 37.5V, no local maximum $nL_{m1}$ can be found to meet both peak gains in Mode I and II, according to an example embodiment.
FIG. 10 is a table including circuit design parameters for a known resonant power converter (case 1), the known resonant power converter using a disclosed design methodology (case 2), and a disclosed multi-transformer resonant power converter having at least two transformers in series including a switched series transformer using a disclosed design methodology (case 3).

FIG. 8 shows the magnetizing RMS currents change as load and magnetizing inductance vary, which indicates that lowest RMS current is achievable by choosing an appropriate magnetizing inductance. It is noted that the local maximum $nL_{m1}$ increases as Vth decreases from 50V as shown in FIG. 9, but when the threshold voltage reaches to 37.5V, no local maximum $nL_{m1}$ can be found to meet both peak gains in Mode I and II.

EXAMPLES

Disclosed embodiments are further illustrated by the following specific Examples, which should not be construed as limiting the scope or content of this Disclosure in any way.

An example dual transformer LLC power converter and design methodology was reduced to practice by building a 250 W, 210V output dual transformer LLC power converter prototype. The circuit key parameters are listed below. To verify the accuracy of the developed numerical model, it is suggested to be verified first before being applied to the design. The power devices, core sizes and resonant capacitors were as follows:

Switches at primary side (S1-S4): IRFS4115
Bidirectional Switch (S5-S6): STV300NH02L
Output diodes (D1-D8): STTH3R06
Resonant Capacitor: WIMA Film capacitor
Main Transformer core $T_1$: RM12(3C95)
Inductor core Lr: E30/11/9 (3C96)
Auxiliary Transformer core $T_2$: RM10(3C95)

Figure 11:
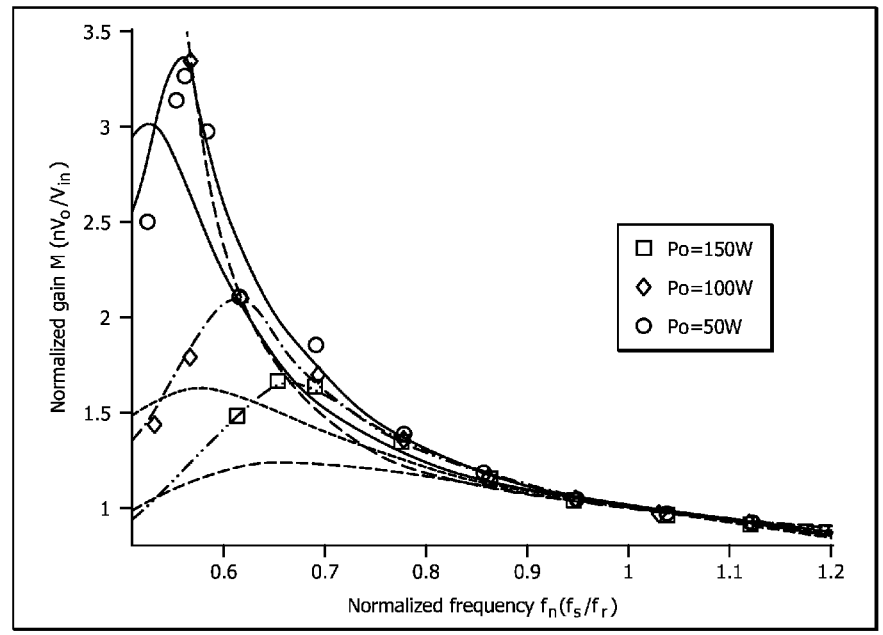
FIG. 11 provides gain curves obtained from mode analysis (solid lines), FHA (dash lines) and experiment (markers), and estimated peak gain trajectory (dash-dot lines) with "Δ" markers showing the estimated peak gain points at corresponding loads, according to an example embodiment.

The DC gains in configuration 1 were measured from the prototype power converter to compare with the ones obtained in numerical calculation under different load conditions. The DC gain curves obtained from the mathematical calculation were found to agree pretty well with the ones measured in the experiment as shown in FIG. 11, which indicates the numerical model has a very high accuracy to guide the design process for the LLC converter. The comparison shows that the gain curve obtained from numerical model has much higher accuracy than FHA. When the switching frequency is close to resonant frequency $f_r$, the gains obtained from FHA is almost the same as the ones solved from the numerical model. However, if the operation frequency deviates away from $f_r$, the gain difference from two methods tends to become larger. For a wide input voltage range, FHA can fail to provide an accurate gain prediction, which can impose a penalty on overall efficiency.

To verify the efficiency improvement of a disclosed LLC converter and the validity of the proposed design methodology, three cases are chosen to carry out the efficiency comparison studies. The first case is a conventional single T LLC resonant power converter topology, whose circuit parameters are determined using FHA model. The second case uses same topology. However, the accurate numerical model described herein was applied to design the circuit key parameters. The third case is the disclosed topology with the disclosed design method. The circuit design parameters for these three cases as shown in FIG. 10 are obtained by using same criterion described herein.

Figure 12A:
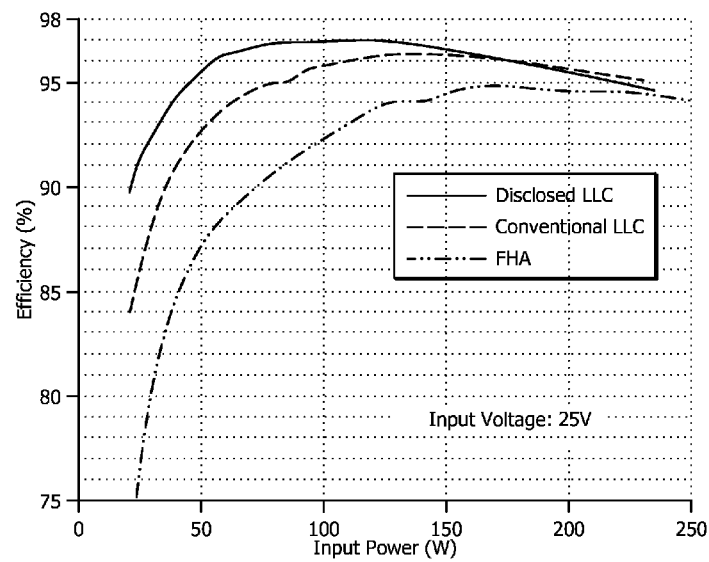
FIGS. 12A-C shows the efficiency curves of the three cases with different Vin values (25V, 60V and 100V) and without taking into account the driving power, which varied from 0.5 to 0.8 W depending on the switching frequency, according to an example embodiment.
Figure 12B:
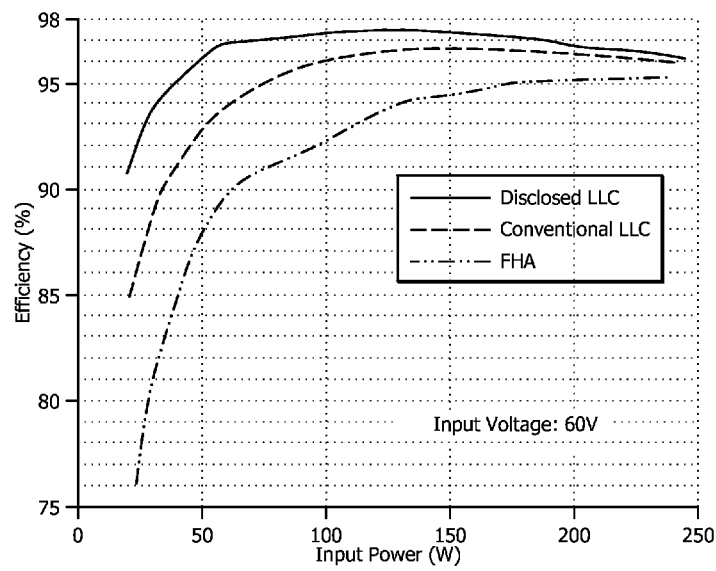
Figure 12C:
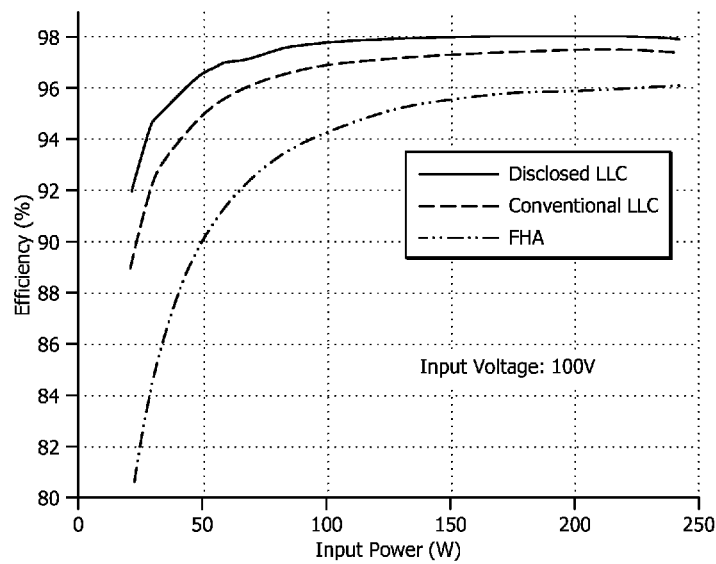

FIG. 11 provides gain curves obtained from mode analysis (solid lines), FHA (dash lines) and experiment (markers), and estimated peak gain trajectory (dash-dot lines) with "Δ" markers showing the estimated peak gain points at corresponding loads. FIGS. 12A-C shows the efficiency curves of the three cases with different Vin values (25V, 60V and 100V) and without taking into account the driving power, which varied from 0.5 to 0.8 W depending on the switching frequency. The efficiency data are acquired by a power analyzer (PZ4000). The peak efficiency, reaching 98%, can be further improved by using lower on-resistance MOSFETs. To change the configuration smoothly and safely, current at the resonant tank was reset to zero by turning off all the main switches.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

Thus, the breadth and scope of the subject matter provided in this Disclosure should not be limited by any of the above explicitly described embodiments. Rather, the scope of this Disclosure should be defined in accordance with the following claims and their equivalents.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A resonant power converter, comprising:
a switch network comprising a plurality of power switches configured for receiving input power having a time varying voltage Vin, said switch network providing a first switched node and a second switched node;
resonant circuitry coupled to receive biasing provided by said first switched node, said resonant circuitry comprising in series combination an inductor, a capacitor, a primary winding of a first transformer ($T_1$) and a primary winding of a second transformer ($T_2$), wherein said second switched node is directly connected to a low side node of said $T_2$;
at least one switch connected in parallel to said primary winding of said $T_2$ operable for providing a first mode that includes said $T_2$ in said resonant circuitry and a second mode that excludes said $T_2$ from said resonant circuitry;
wherein a secondary winding on a secondary side of said $T_2$ and a secondary winding on a secondary side of said $T_1$ are connected electrically in parallel for driving an output capacitor (Co), and
a first rectifier and a second rectifier, wherein a secondary winding of said $T_1$ is connected across said Cout by said first rectifier, and wherein a secondary winding of said $T_2$ is connected across said Cout by said second rectifier.

2. The resonant power converter of claim 1, wherein said resonant power converter is configured to be in said first mode when said Vin is ≥a predetermined voltage threshold (Vth), and said second mode when said Vin is <said Vth.

3. The resonant power converter of claim 1, wherein said switch comprises a bidirectional switch.

4. The power converter of claim 3, wherein the bidirectional switch comprises a plurality of power MOS switches hooked in series.

5. The resonant power converter of claim 1, wherein said switch network is configured to provide switchable operation between full bridge operation and half bridge operation for said resonant power converter.

6. A method of power converting, comprising:
providing a switch network comprising a plurality of power switches configured for receiving input power having a time varying voltage Vin, said switch network providing said switch network providing a first switched node and a second switched node and a resonant power converter comprising in series an inductor, a capacitor, a primary winding of a first transformer ($T_1$) and a primary winding of a second transformer ($T_2$), wherein said second switched node is directly connected to a low side node of said $T_2$;
at least one switch connected in parallel to said primary winding of said $T_2$, wherein a secondary winding of $T_2$ and a secondary winding of $T_1$ are connected electrically in parallel for driving an output capacitor (Co), including a first rectifier and a second rectifier, wherein a secondary winding of said $T_1$ is connected across said Cout by said first rectifier, and wherein a secondary winding of said $T_2$ is connected across said Cout by said second rectifier;
switching using said switch between a first mode where a first resonant current passes through said inductor, said capacitor, said primary winding of said $T_1$ and said primary winding of said $T_2$ and a second mode where a second resonant current passes through said inductor, said capacitor, said primary winding of said $T_1$ that bypasses said primary winding of said $T_2$.

7. The method of claim 6, wherein said resonant power converter is in said first mode when said Vin is ≥a predetermined voltage threshold (Vth), and said second mode when said Vin is <said Vth.

8. The method of claim 6, wherein said switching is implemented by a bidirectional switch.

9. The method of claim 6, wherein said resonant power converter is switched between full bridge operation and half bridge operation.

10. A resonant power converter, comprising:
a switch network comprising a plurality of power switches configured for receiving input power having a time varying voltage Vin, said switch network providing said switch network providing a first switched node and a second switched node;

resonant circuitry coupled to receive biasing provided by said first switched node, said resonant circuitry comprising in series combination an inductor, a capacitor, a primary winding of a first transformer ($T_1$) and a primary winding of a second transformer ($T_2$), wherein said second switched node is directly connected to a low side node of said $T_2$;

at least one switch operable for providing a first mode that includes said $T_2$ in said resonant circuitry and a second mode that excludes said $T_2$ from said resonant circuitry;

wherein a secondary winding on a secondary side of said $T_2$ and a secondary winding on a secondary side of said $T_1$ are connected electrically in parallel for driving an output capacitor (Co), and a first rectifier and a second rectifier, wherein a secondary winding of said $T_1$ is connected across said Cout by said first rectifier, and wherein a secondary winding of said $T_2$ is connected across said Cout by said second rectifier, wherein said resonant power converter is configured to be in said first mode when said Vin is ≥a predetermined voltage threshold (Vth), and said second mode when said Vin is <said Vth.

11. The resonant power converter of claim 1, wherein said T1 is larger in size than said T2.

12. The method of claim 6, wherein said T1 is larger in size than said T2.

13. The resonant power converter of claim 10, wherein said T1 is larger in size than said T2.

\* \* \* \* \*

UNITED STATES PATENT AND TRADEMARK OFFICE
CERTIFICATE OF CORRECTION

| | |
|---|---|
| PATENT NO. | : 9,130,462 B2 |
| APPLICATION NO. | : 13/365871 |
| DATED | : September 8, 2015 |
| INVENTOR(S) | : Haibing Hu et al. |

It is certified that error appears in the above-identified patent and that said Letters Patent is hereby corrected as shown below:

In the Specification

Please add this paragraph in column 1, at line 10:

Statement Regarding Federally Sponsored Research

This invention was made with Government support under agency contract number DEEE0003176 awarded by the Department of Energy. The Government has certain rights in this invention.

Signed and Sealed this
Twelfth Day of July, 2016

Michelle K. Lee
*Director of the United States Patent and Trademark Office*